United States Patent [19]
Matsumura et al.

[11] Patent Number: 5,625,493
[45] Date of Patent: Apr. 29, 1997

[54] IMAGE DISPLAY APPARATUS HAVING A BEAM COMBINER FOR SUPERIMPOSING FIRST AND SECOND LIGHTS

[75] Inventors: Susumu Matsumura, Kawaguchi; Naosato Taniguchi; Yoko Yoshinaga, both of Tokyo; Shin Kobayashi, Atsugi; Toshiyuki Sudo, Kawasaki; Hideki Morishima, Tokyo; Tadashi Kaneko, Isehara, all of Japan

[73] Assignee: Canon Kabushiki Kaisha, Tokyo, Japan

[21] Appl. No.: 162,756

[22] Filed: Dec. 7, 1993

[30] Foreign Application Priority Data

Dec. 8, 1992 [JP] Japan ............................ 4-352013

[51] Int. Cl.$^6$ ............................................. G02B 27/14
[52] U.S. Cl. ............................................. 359/630; 359/633
[58] Field of Search ............................ 359/630, 631, 359/632, 634, 13, 14, 633

[56] References Cited

U.S. PATENT DOCUMENTS

| | | | |
|---|---|---|---|
| 3,059,519 | 10/1962 | Stanton | 88/1 |
| 3,549,803 | 12/1970 | Becht | 359/631 |
| 3,680,946 | 8/1972 | Bellows | 359/631 |
| 4,081,209 | 3/1978 | Heller et al. | 350/174 |
| 4,592,620 | 6/1986 | Poole | 359/631 |
| 4,821,307 | 4/1989 | Flint, III | 359/630 |
| 4,927,234 | 5/1990 | Banbury | 359/630 |
| 5,035,473 | 7/1991 | Kuwayama et al. | 350/3.7 |
| 5,089,903 | 2/1992 | Kuwayama et al. | 359/15 |
| 5,162,928 | 11/1992 | Taniguchi et al. | 359/13 |
| 5,210,626 | 5/1993 | Kumayama et al. | 359/13 |
| 5,305,124 | 4/1994 | Chern | 359/630 |
| 5,392,158 | 2/1995 | Tosaki | 359/630 |
| 5,398,134 | 3/1995 | Ikegaya | 359/630 |

FOREIGN PATENT DOCUMENTS

3203478  9/1991  Japan.

*Primary Examiner*—Georgia Y. Epps
*Assistant Examiner*—Ricky Mack
*Attorney, Agent, or Firm*—Fitzpatrick, Cella, Harper & Scinto

[57] ABSTRACT

An image display apparatus includes an image generator for generating first light having image information, and a beam combiner for superimposing the first light and second light which is incident upon the beam combiner from a direction different from that of the first light, and for guiding the superimposed light to a pupil of an observer. Also provided is a reflector positioned in a direction different from the incident direction of the second light on the beam combiner. The first light is incident upon the reflector via the beam combiner, and is reflected back to the beam combiner after being reflected by the reflector.

10 Claims, 8 Drawing Sheets

IMAGE DISPLAY APPARATUS HAVING A BEAM COMBINER FOR SUPERIMPOSING FIRST AND SECOND LIGHTS

BACKGROUND OF THE INVENTION

1. Field of the Invention

This invention relates to an image display apparatus, and more particularly, to an image display apparatus in which by utilizing a half-mirror, a hologram optical element or the like, a high picture quality virtual image of display information displayed on an image display device, serving as an image generator, and image information, such as a natural landscape or the like, are optically and spatially superimposed, so that the two kinds of information can be simultaneously observed on a large picture surface.

2. Description of the Related Art

Large-size CRT display apparatuses, projection TV apparatuses and the like have been used as image display apparatuses in which image information displayed on an image display device, such as a liquid-crystal display device or the like, is observed as a large-size image having a presence.

Such an image display apparatus requires a large space. Accordingly, if it is intended to install such an apparatus in a small room, a proper distance for observation cannot be secured. In addition, different people cannot see different programs.

Figure 1:
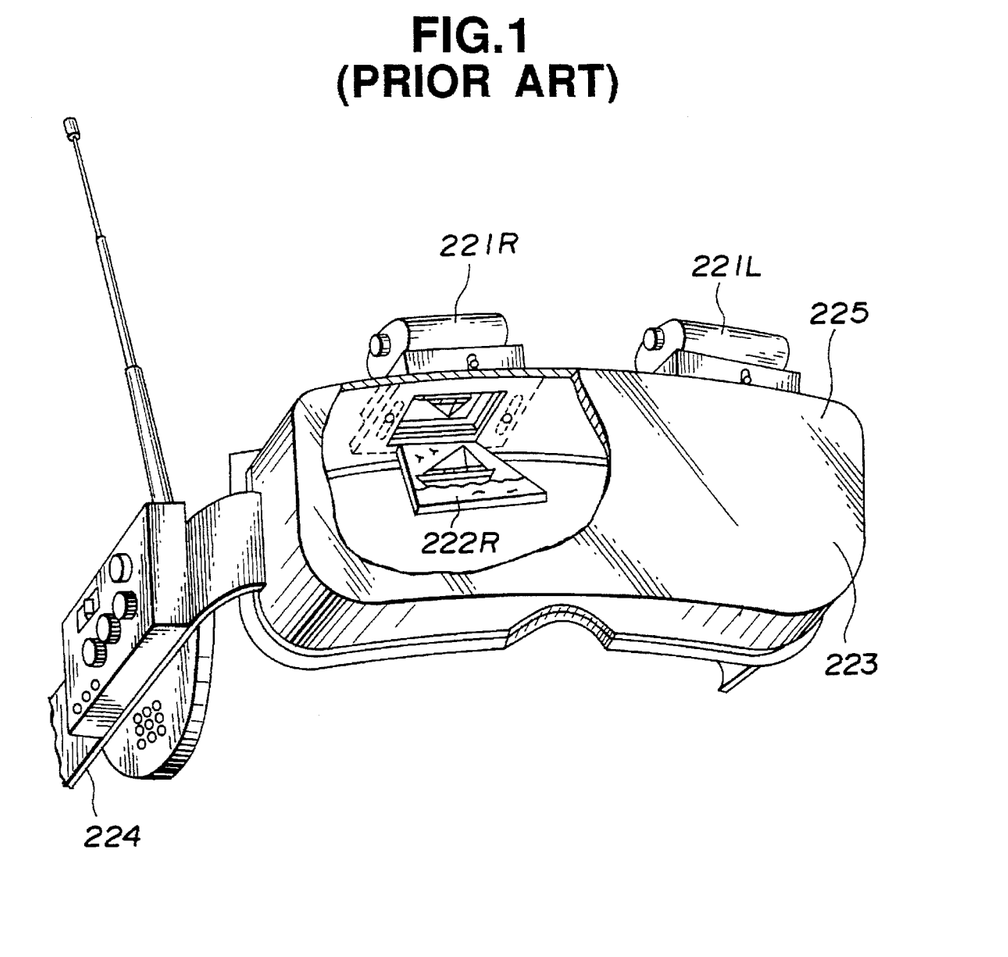
FIG. 1 is a diagram illustrating the schematic configuration of a principal portion of a conventional image display apparatus.

In order to overcome the above-described problems, an image display apparatus has, for example, been proposed in Japanese Patent Laid-open Application (Kokai) No. 3-203478 (1991), in which, as shown in FIG. 1, a light beam from an image display device is directly guided to an eye (a pupil) of the observer using an optical system disposed in the vicintiy of the face of the observer so that large-size image information can be observed.

The principal portion of the apparatus shown in FIG. 1 will now be described. In FIG. 1, reference numerals 221R and 221L represent liquid-crystal color display devices for the right eye and the left eye of the observer, respectively. A part of the light beam from image information displayed on liquid-crystal color display device 221R (221L) is reflected by a trapezoid beam splitter (half-mirror) 222R (222L, not shown) disposed in front of the right (left) eye of the observer (not shown), and is incident upon a concave mirror lens 223 provided in the front side. The light beam reflected by the concave mirror lens 223 is incident upon the pupil of the observer after passing through the beam splitter 222R (222L).

Thus, the observer can observe the image information displayed on the liquid-crystal color display devices 221R and 221L as a virtual image at a predetermined position in front of the concave mirror lens 223.

Various kinds of image display apparatuses of this kind have been proposed in which display information providing a parallax between the right and left eyes of the observer is displayed so that the observer can observe a stereoscopic image.

In the conventional image display apparatus shown in FIG. 1, display information from each display device is guided to the corresponding pupil of the observer via the half-mirror and a semitransparent reflecting concave mirror lens. The display information and image information, such as an external landscape or the like, are superimposed using a beam combiner, so that the observer can simultaneously observe the two kinds of information.

The light beam having the display information from the display device is reflected by the half-mirror and the reflecting concave mirror lens. Hence, if the reflectivity (transmittance) of these components is assumed to be 50%, the overall light-beam utilization efficiency is $(0.5)^3 = 0.125$. That is, the utilization efficiency of the light beam is poor, and therefore the display information becomes obscure.

In the conventional image display apparatus, if it is intended to provide large display information, the curvature of the semitransparent reflecting mirror lens must be reduced so as to increase the optical reflective power. As a result, the curved surface of the mirror lens deflects the transmitted light beam, thereby causing a decrease in the superimposing property.

Furthermore, since the display devices comprising the liquid-crystal displays must be provided in the vicinity of the reflecting concave mirror lens, the reflected light beam is eclipsed, and therefore it becomes difficult to observe the entire picture surface in an excellent condition.

In an apparatus in which display information having a parallax is displayed from display devices by providing two kinds of image information for the right and left eyes of the observer so that the observer can observe a stereoscopic image, the depth of field of the eyes of the observer must coincide with the range of image depth of the sterepscopic display information.

In this case, in order to provide an image display apparatus having a sufficient stereoscopic effect, it is necessary to display image information as bright as possible, to increase the depth of field of the eyes of the observer by reducing the size of the iris of each eye of the observer, and to increase the range of image depth of the stereoscopically displayed image.

When a portable stereoscopic-image display apparatus is used, the light-beam utilization efficiency must be further increased in order to display bright image information with a small electric power consumption.

However, it is very difficult to obtain bright image information by increasing the light-beam utilization efficiency. Furthermore, when a large picture surface is displayed, distortion in the displayed image becomes prominent, causing the observer to feel that the image is unnatural.

SUMMARY OF THE INVENTION

It is an object of the present invention to provide an image display apparatus in which by appropriately positioning respective elements, the utilization efficiency of the light beam having image information from a display device is increased, whereby image information of a bright large picture having little distortion can be easily obtained, both the display information and image information, such as an external landscape or the like, can be observed in the same field of view in excellent condition, and the size of the entire apparatus can be reduced.

It is another object of the present invention to provide an image display apparatus, which is suitable for a stereoscopic-image observation apparatus, and in which display information that causes little fatigue to eyes and has a stereoscopic effect can be observed.

It is still another object of the present invention to provide an image display apparatus in which display information can be observed with a high image quality by correcting various kinds of aberrations causing distortion in an observation system.

According to one aspect, the present invention which achieves these objectives relates to an image display appartus comprising a light source emitting light, an image generator generating image information carried in first light supplied by the image generator, and a beam combiner. The beam combiner superimposes the first light and second light which is incident upon the beam combiner from a direction different from that of the first light, and guides the combined light to a pupil of an observer. Also provided is a reflector, which is positioned in a direction different from the incident direction of the second light on the beam combiner, for receiving the first light via the beam combiner and reflecting the first light back to the beam combiner.

In one embodiment, the beam combiner transmits at least a part of the first light from the image generator to the reflector, and reflects at least a part of the light incident upon the beam combiner after being reflected by the reflector to the pupil of the observer.

In another embodiment, the image generator generates two kinds of light including image information having a parallax therebetween, and the beam combiner and the reflector guide the two kinds of light to the right and left eyes of the observer.

In still another embodiment, the beam combiner comprises an optical element having a lens function, and the optical element comprises a hologram for reflectively diffracting the light or a Fresnel lens.

In still another embodiment, the reflector images the light having image information from the image generator in the vicinity of the beam combiner.

In still another embodiment, the apparatus further comprises a light-amount adjusting member for adjusting the amount of the second light before the second light is incident upon the beam combiner. The light-amount adjusting member comprises a liquid crystal.

According to another aspect, the present invention relates to an image display apparatus comprising a light source emitting light, an image generator for generating image information carried in a first light supplied by the light source, and a beam combiner. The beam combiner superimposes the first light and second light which is incident upon the beam combiner from a direction different from that of the first light, and guides the combined light to a pupil of an observer. The apparatus further comprises a relay optical system having an optical system, positioned between the image generator and the beam combiner, comprising optical elements which are off-centered and/or inclined with respect to the optical axis of the relay optical system.

In one embodiment, a reflector is provided and is positioned in a direction different from the incident direction of the second light on the beam combiner. The first light is incident upon the reflector via the beam combiner, and is reflected back to the beam combiner.

In another embodiment, a cylindrical telescopic system is provided in the optical path of the first light.

These and other objects, advantages and features of the present invention will become more apparent from the following description of the preferred embodiments taken in conjuction with the accompanying drawings.

DESCRIPTION OF THE PREFERRED EMBODIMENTS

Figure 2:
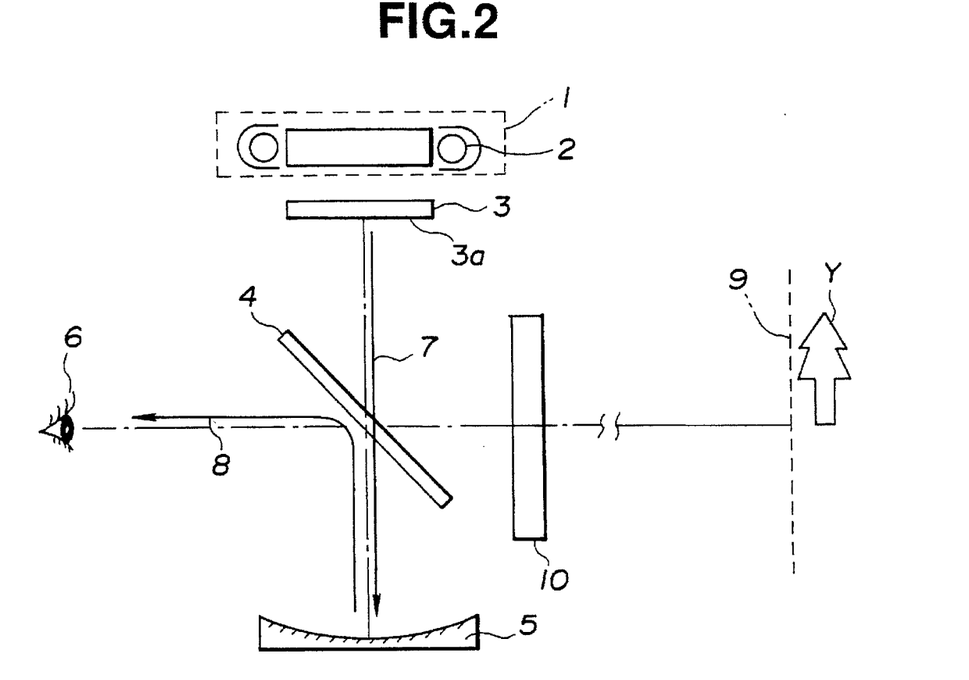
FIG. 2 is a diagram illustrating the schematic configuration of a principal portion of an image display apparatus according to a first embodiment of the present invention.

FIG. 2 is a diagram illustrating the schematic configuration of a principal portion of an image display apparatus according to a first embodiment of the present invention.

In FIG. 2, illuminating unit 1 includes a fluorescent lamp 2, serving as a light source. Display device 3, serving as an image generator, comprises a liquid-crystal display device, and provides display information 3a. Beam combiner 4 comprises a half-mirror. Reference numeral 5 represents a reflecting concave mirror lens. Reference numeral 6 represents the position of a pupil for observation, which corresponds to the position of an eyeball of the observer. Reference numeral 9 represents a virtual image plane of display information 3a produced by reflecting concave mirror lens 5. Light-amount adjusting member 10 adjusts the amount of transmitted light utilizing a liquid crystal. Symbol Y represents image information, such as a natural landscape or the like.

In the present embodiment, light beam 7 having display information 3a from liquid-crystal display device 3 illuminated by illuminating unit 1 first passes through half-mirror 4 (light reflected by half-mirror 4 is omitted since it travels in a direction opposite to the pupil 6 and therefore does not contribute to image display), is then reflected by reflecting concave mirror lens 5, and again reaches half-mirror 4. Light beam 8 reflected by half-mirror 4 reaches the pupil 6 of the observer. The observer simultaneously observes display information 3a of liquid-crystal display device 3 produced by reflecting concave mirror lens 5 at the virtual-image plane 9, and image information Y present in the vicinity of the virtual-image plane 9 in the same field of view while spatially superimposing the two kinds of information.

In the present embodiment, the light beam from external image information Y passes through half-mirror 4, and reaches the pupil 6 of the observer. At that time, image information Y and the virtual image of display information 3a of liquid-crystal display device 3 are superimposed, so that the two kinds of information can be recognized on a large picture plane. Light-amount adjusting member 10 adjusts the amount of transmitted light of external image information Y so that the brightness of liquid-crystal display device 8 and the amount of external light are balanced.

Light-amount adjusting member 10 of the present embodiment is configured, for example, by parallel plates, each having a transparent electrode, and a liquid-crystal layer held by the plates. By changing the voltage applied to the liquid-crystal layer, the transmittance of light-amount adjusting member 10 can be changed.

For example, the observer adjusts the voltage applied to the liquid-crystal layer of light-amount adjusting member 10 using a dial (not shown) or the like. If the voltage is adjusted so that the transmitted amount of the external light equals zero, the observer can observe only display information 3a from liquid-crystal display device 3 instead of a superimposed display with image information Y.

In the present embodiment, if it is assumed that both the reflectivity and the transmittance of half-mirror 4 equal 50%, and no optical loss is produced in reflecting concave mirror lens 5 (i.e., the reflectivity of the mirror is 100%), the percentage of light reaching eye 6, i.e., the light-amount utilization efficiency equals $(0.5)^2=0.25$. This value equals twice the light-amount utilization efficiency (0.125) of the conventional apparatus.

In the present embodiment, the size of the observed virtual-image plane 9 is determined by the optical power of reflecting concave mirror lens 5 and the distance between reflecting concave mirror lens 5 and liquid-crystal display device 3.

Even if these parameters relating to the optical imaging are more or less changed, the superimposing property is not influenced thereby.

In the present embodiment, by adding an automatic voltage application circuit which turns on and off the voltage applied to light-amount adjusting member 10 by detecting the presence/absence of a video signal to liquid-crystal display device 3, the brightness of display information 3a and the amount of the external light can be automatically balanced when display information 3a is displayed, instead of the above-described manual balancing operation.

As described above, in the image display apparatus of the present embodiment, the virtual-image plane 9 of display information 3a of liquid-crystal display device 3, and image information Y, such as a landscape or the like, behind beam combiner 4 are spatially superimposed via beam combiner 4, so that the two kinds of information can be observed in the same field of view as one large image.

Figure 3:
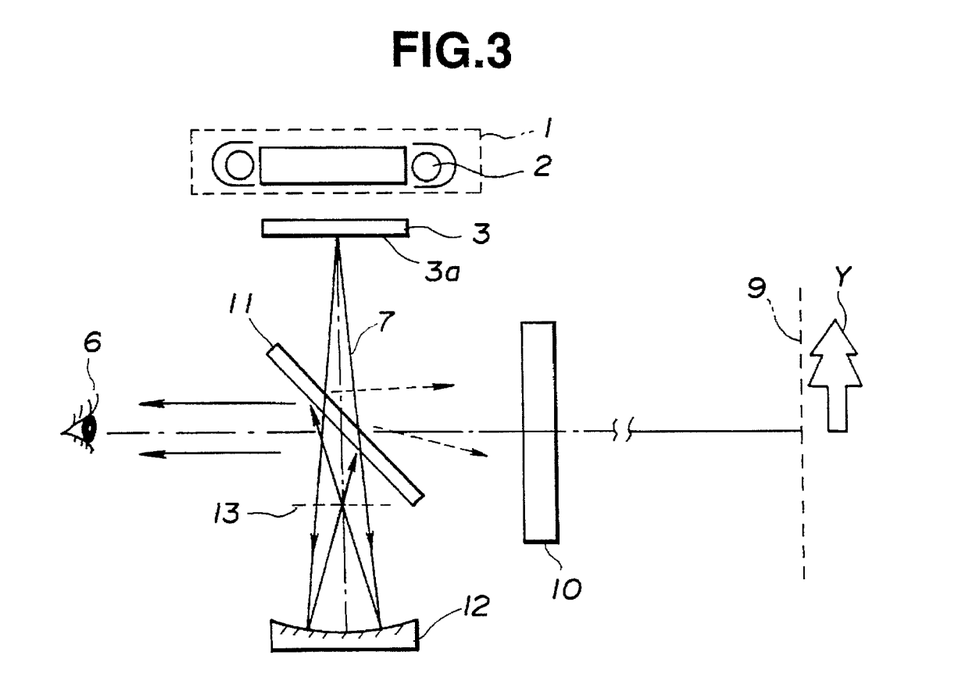
FIG. 3 is a diagram illustrating the schematic configuration of a principal portion of an image display apparatus according to a second embodiment of the present invention.

FIG. 3 is a diagram illustrating the schematic configuration of an image display apparatus according to a second embodiment of the present invention.

The apparatus of the present embodiment differs from the apparatus of the first embodiment in that reflecting hologram lens 11 is used as a beam combiner instead of the half-mirror, and reflecting concave mirror lens 12, whose reflective optical power is different from that of reflecting concave mirror lens 5. Other components are substantially the same as those in the first embodiment. In FIG. 3, the same components as those shown in FIG. 2 are represented by the same reference numerals.

In the present embodiment, light beam 7 from liquid-crystal display device 3 passes through reflecting hologram lens 11, and reaches reflecting concave mirror lens 12. Reflecting concave mirror lens 12 reflects this light beam to provide a real image of display information 3a of liquid-crystal display device 3 on intermediate image plane 13. The light beam having display information 3a of liquid-crystal display device 3 imaged on intermediate image plane 13 is reflected by reflecting hologram lens 11 as diffracted light in the direction of the pupil 6 of the observer, to image display information 3a on the virtual-image plane 9. Thus, the observer observes display information 3a on the virtual-image plane 9 as a magnified image.

Reflecting hologram lens 11 has the reflective optical power such that its focus is present at a position slightly separated from the intermediate image plane 13. Accordingly, display information 3a of liquid-crystal display device 3 imaged on the intermediate image plane 13 in the vicinity of the focal length of reflecting hologram lens 11 is magnified as a virtual image with a large magnification.

Figure 4:
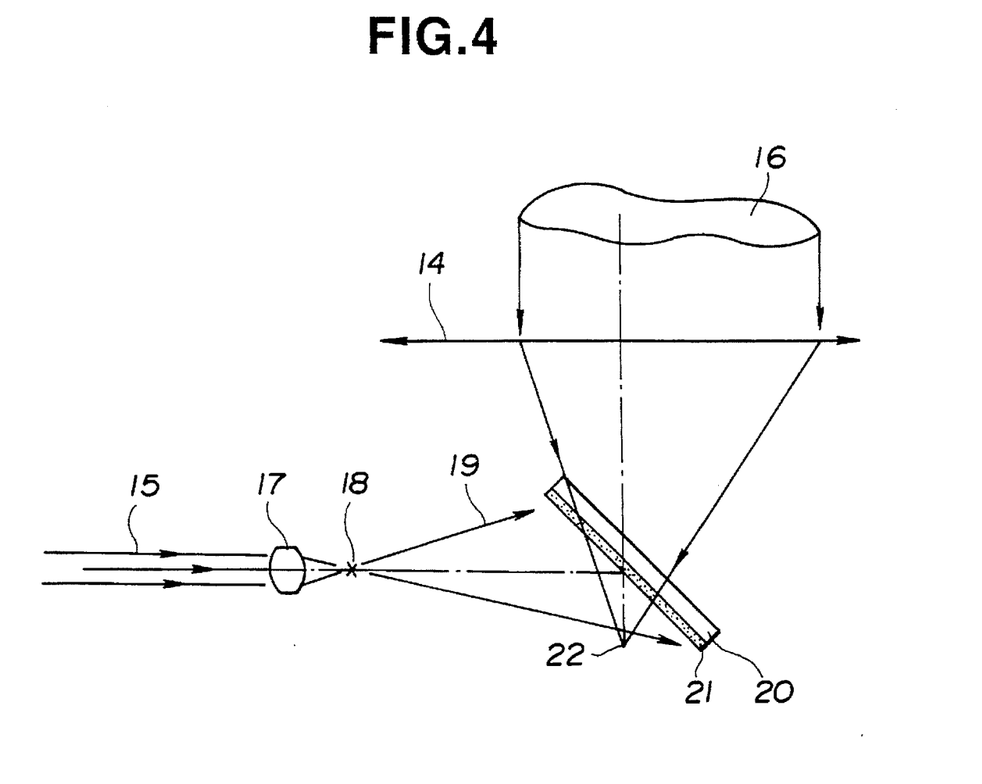
FIG. 4 is a diagram illustrating a method of providing the hologram lens shown in FIG. 2.

FIG. 4 is a diagram illustrating the schematic configuration of an optical system for manufacturing the reflecting hologram lens used in the second embodiment.

In FIG. 4, a monochromatic light beam having a wavelength of 514.5 nm obtained from an Ar laser is separated into two light beams by a beam splitter (not shown). One of the light beams is guided to objective lens 17 as light beam 15. After being focused at position 18 corresponding to the neighborhood of the pupil 6 of the observer shown in FIG. 3, light beam 15 is incident upon hologram photosensitive material 21 coated on glass substrate 20 as a divergent light beam 19.

Another light beam is converted into a large-diameter light beam by an objective lens and a collimating lens (not shown), and is guided to collimating lens 14 as collimated light beam 16, which is incident upon hologram photosensitive material 21. The position of focus 22 of collimating lens 14 corresponds to the position in the vicinity of the intermediate image plane 13 shown in FIG. 3. Accordingly, the light beam travelling from collimating lens 14 is condensed at focus point 22.

By recording interference fringes formed in hologram photosensitive material 21 by the above-described two light beams 15 and 16 and thereafter developing hologram photosensitive material 21, phase-type reflecting hologram lens 11 is obtained. At that time, by appropriately controlling the exposure time for hologram photosensitive material 21, a sufficient diffraction efficiency of hologram after development can be obtained.

It is desirable that hologram photosensitive material 21 has a certain thickness so that reflecting hologram lens 11 has a sufficient diffraction efficiency, for example, a thickness of about 10 µm. A dichromate-gelatin photopolymer or the like is suitable as the phase-type hologram photosensitive material.

Thus, this reflecting hologram lens 11 has angle-selective characteristics, and has a high diffraction efficiency for a light beam within a specific wavelength range and a specific incident-angle range.

Accordingly, in FIG. 3, while the divergent light beam from liquid-crystal display device 3 is slightly reflectively diffracted, a sufficient amount of transmitted light beam is guided to reflecting concave mirror 12. The divergent light beam from the intermediate image plane 13 matches with the angle-selective characteristics of the reflecting hologram lens 11, and therefore almost all of the light beam is diffracted and reaches the pupil 6 of the observer.

In the present embodiment, it is desirable that an interference optical filter, which selectively passes only light having a wavelength of 514.5 nm from the light beam travelling from liquid-crystal display device 3 illuminated by illuminating unit 1, is provided immediately after or in the vicinity of liquid-crystal display device 3.

In the present embodiment, the light beam from external image information Y is hardly diffracted by hologram lens 11, and reaches the pupil 6 of the observer. The observer simultaneously observes both display information 3 and external image information Y.

Figure 5:
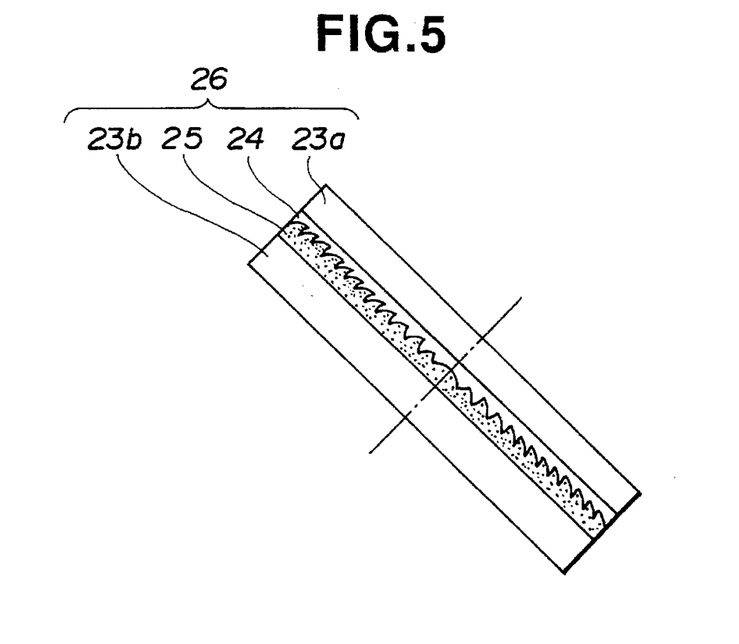
FIG. 5 is a cross-sectional view of a principal portion of a Fresnel lens used in the present invention.

In the present embodiment, a semitransparent concave Fresnel lens 26 shown in FIG. 5 may be used instead of the hologram lens 11.

This Fresnel lens 26 is made by providing a relief-type concave Fresnel lens 24 on a plane substrate 23a, providing a reflective coating having a reflectivity of 50% on the lens 24, burying the relief structure using adhesive 25 having the same refractive index as the material of the lens 24, and bonding a plane substrate 23b to the surface layer of the adhesive 25. Such a Fresnel lens is suitable for mass production.

While the Fresnel lens 26 has a lens function for a reflected light beam due to the Fresnel-lens structure having the reflective coating, it does not have a lens function for a transmitted light beam since the relief structure is buried by the adhesive having the same refractive index as that of the structure, and acts merely as a half-mirror having a transmittance of 50%.

Accordingly, the light beam from liquid-crystal display device 3 reaches reflecting concave mirror lens 12 with the transmittance of 50%, and the transmitted light beam of external image information Y reaches the pupil 8 of the observer with the transmittance of 50%, so that the observer can simultaneously recognize display information 3a of liquid-crystal display device 3 and external image information Y.

The same observation system as that shown in FIG. 3 can be provided by arranging the focal length of the Fresnel lens 26 so that the real image on the intermediate image plane 13 is imaged onto the virtual-image plane 9.

The angle-selective characteristics of the Fresnel lens 26 is weak compared with the above-described hologram lens 11, and therefore the divergent light beam from liquid-crystal display device 3 is reflected by 50%. However, the reflected light does not travel in the direction of the pupil 6 of the observer, but travels toward the outside. Hence, only a loss is produced in the amount of light, and the observed image is not adversely influenced.

By such an observation system, a large magnified image of the liquid-crystal display device 3 can be observed. In some cases, however, distortion is produced in the magnified display information. In such a case, reflecting concave mirror lens 12 may produce a distortion having an opposite sign in the image on the intermediate image plane 13 to correct the distortion produced by hologram lens 11.

Figure 6:
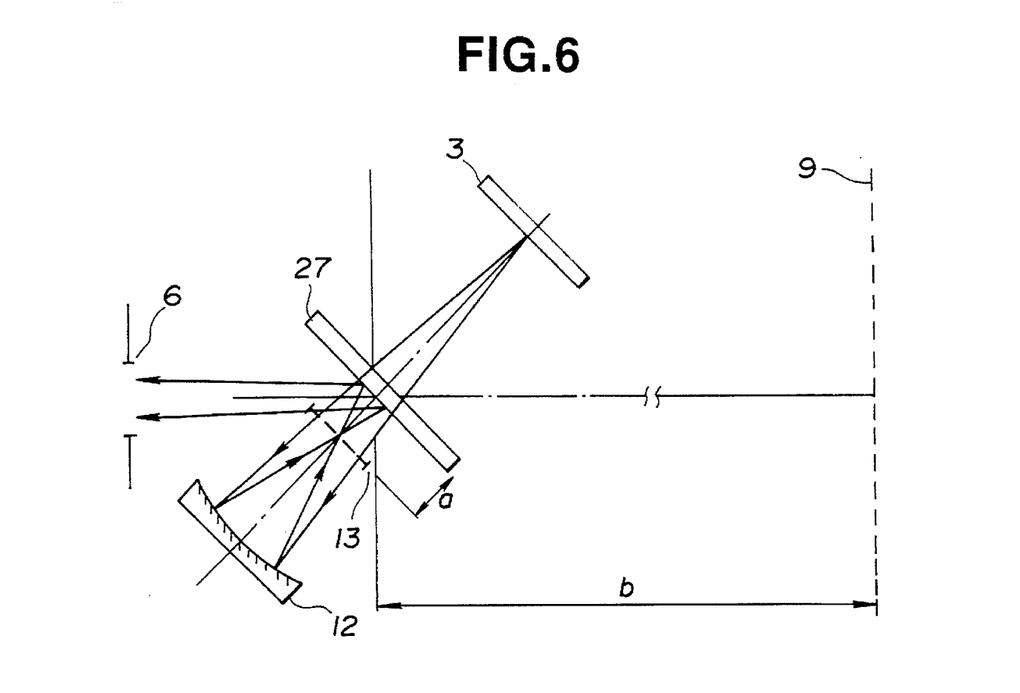
FIG. 6 is a diagram illustrating the schematic configuration of a principal portion of an image display apparatus according to a third embodiment of the present invention.

FIG. 6 is a diagram illustrating the schematic configuration of an image display apparatus according to a third embodiment of the present invention.

In the present embodiment, while reducing the distortion, a large magnified picture surface of a virtual image can be observed in an excellent condition. In FIG. 6, the same components as those shown in FIG. 3 are represented by the same reference numerals.

In the present embodiment, the optical axis of liquid-crystal display device 3 and reflecting concave mirror lens 12 is substantially perpendicular to hologram lens 27, unlike the system in the second embodiment.

As a result, in the present embodiment, intermediate image plane 13 of liquid-crystal display device 3 produced by reflecting concave mirror lens 12 is substantially parallel to hologram lens 27, and is situated at a position separated from it by a distance "a". The image on this intermediate image plane 13 is reflectively diffracted by reflecting hologram lens 27 in the direction of the pupil 6 of the observer to provide a virtual image of display device 3a on the virtual-image plane 9, which image is observed by the observer.

Strictly speaking, the distance b from hologram lens 27 to the virtual-image plane 9 differs depending on the angle of view since hologram lens 27 is-inclined. However, this distance b is much larger than the distance "a". Hence, if the distance b is assumed, for example, to be 1 m, the ratio a:b is substantially constant irrespective of the angle of view.

Accordingly, in this observation system, the distortion of the display image on the virtual-image plane 9 can be reduced to a much smaller value than in the second embodiment.

In the present embodiment, the semitransparent concave Fresnel lens 26 shown in FIG. 5 may be used instead of hologram lens 27.

Figure 7:
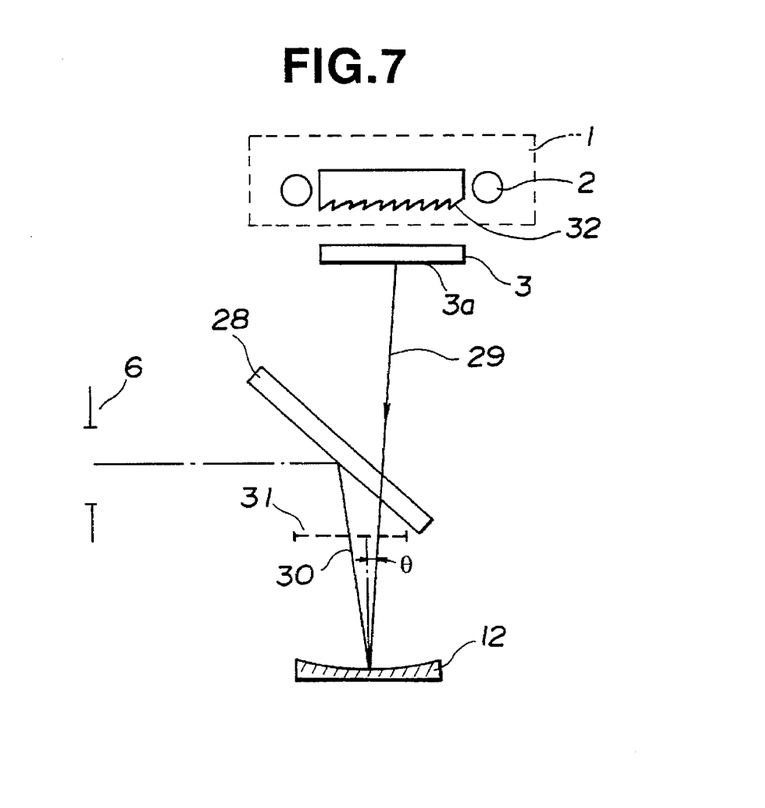
FIG. 7 is a diagram illustrating the schematic configuration of a principal portion of an image display apparatus according to a fourth embodiment of the present invention.

FIG. 7 is a diagram illustrating the schematic configuration of a principal portion of an image display apparatus according to a fourth embodiment of the present embodiment. In FIG. 7, the same components as those shown in FIG. 3 are represented by the same reference numerals.

In the present embodiment, the center of liquid-crystal display device 3 is eccentric relative to the center of reflecting concave mirror lens 12. That is, the principal ray (light beam) 29 from the center of liquid-crystal display device 3 makes an angle 8 with the optical axis of reflecting concave mirror lens 12, and reflected light beam 30 from reflecting concave mirror lens 12 makes an angle θ with the optical axis of reflecting concave mirror lens 12, to image display information 3a of liquid-crystal display device 3 on the intermediate image plane 31. Light beam 30 from the intermediate image plane 31 is reflectively diffracted by hologram lens 28, and reaches the pupil 6 of the observer.

The present embodiment differs from the second embodiment in that the angle of incidence of light beam 29 on hologram lens 28 differs from the angle of incidence of light beam 30 from reflecting concave mirror lens 12 on hologram lens 28 by an angle 2θ.

Accordingly, by making this angle 2θ greater than the half-width of the angle-selective characteristics of hologram lens 28, it is possible to reduce the amount of light beam 29 from liquid-crystal display device 3 reflectively diffracted by hologram lens 28, and to increase the amount of transmitted light, and thereby to improve the light-amount utilization efficiency.

In this arrangement, in order to efficiently utilize the light beam from illuminating unit 1, a relief-grating structure 32 is provided on the surface of a member for guiding light from fluorescent lamp 2 utilizing total reflection, so that the direction of light travelling from illuminating unit 1 coincides with the direction of light beam 29.

Figure 8:
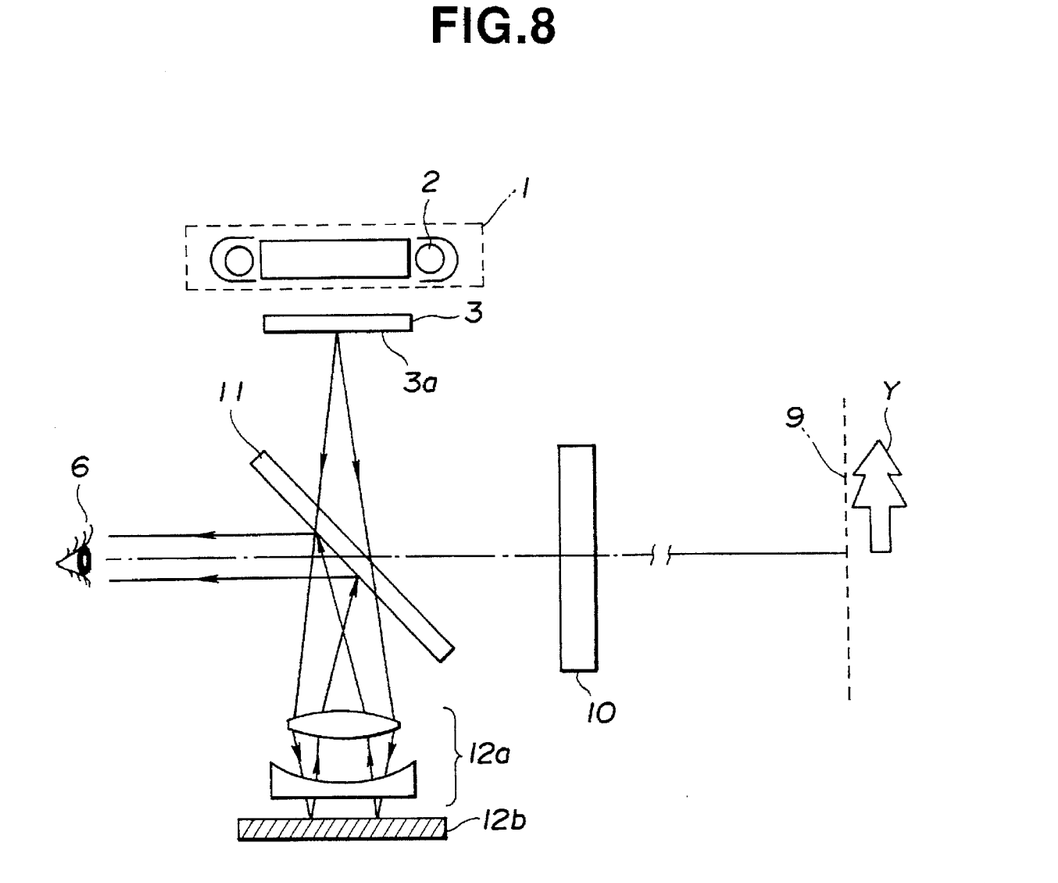
FIG. 8 is a diagram illustrating the schematic configuration of a principal portion of an image display apparatus according to a fifth embodiment of the present invention.

FIG. 8 is a diagram illustrating the schematic configuration of an image display apparatus according to a fifth embodiment of the present invention.

The present embodiment differs from the second embodiment shown in FIG. 3 in that a dioptic system 12a, comprising a dioptic lens, and a plane mirror 12b are used instead of the reflecting concave mirror lens 12. Other components are the same as in the second embodiment.

The present embodiment features in that the distortion produced by hologram lens 11 is effectively corrected by using the dioptic system 12a.

In the above-described first through fifth embodiments, the intermediate imaging system comprising the reflecting concave mirror may be realized by a reflecting hologram lens. In this case, chromatic aberration due to wavelength dispersion produced by the diffraction structure of the combiner hologram lens, serving as the beam combiner, can be cancelled or reduced by the diffraction structure of the hologram lens of the intermediate imaging system.

Furthermore, by using a hologram having narrow wavelength-selecting characteristics, such as a Lippman hologram, for the hologram lens of the intermediate imaging system so that light having wavelengths near the designed wavelength of the beam combiner (hologram) is subjected to selective reflection diffraction, the interference filter provided in the vicinity of the liquid-crystal display device becomes unnecessary.

Figure 9:
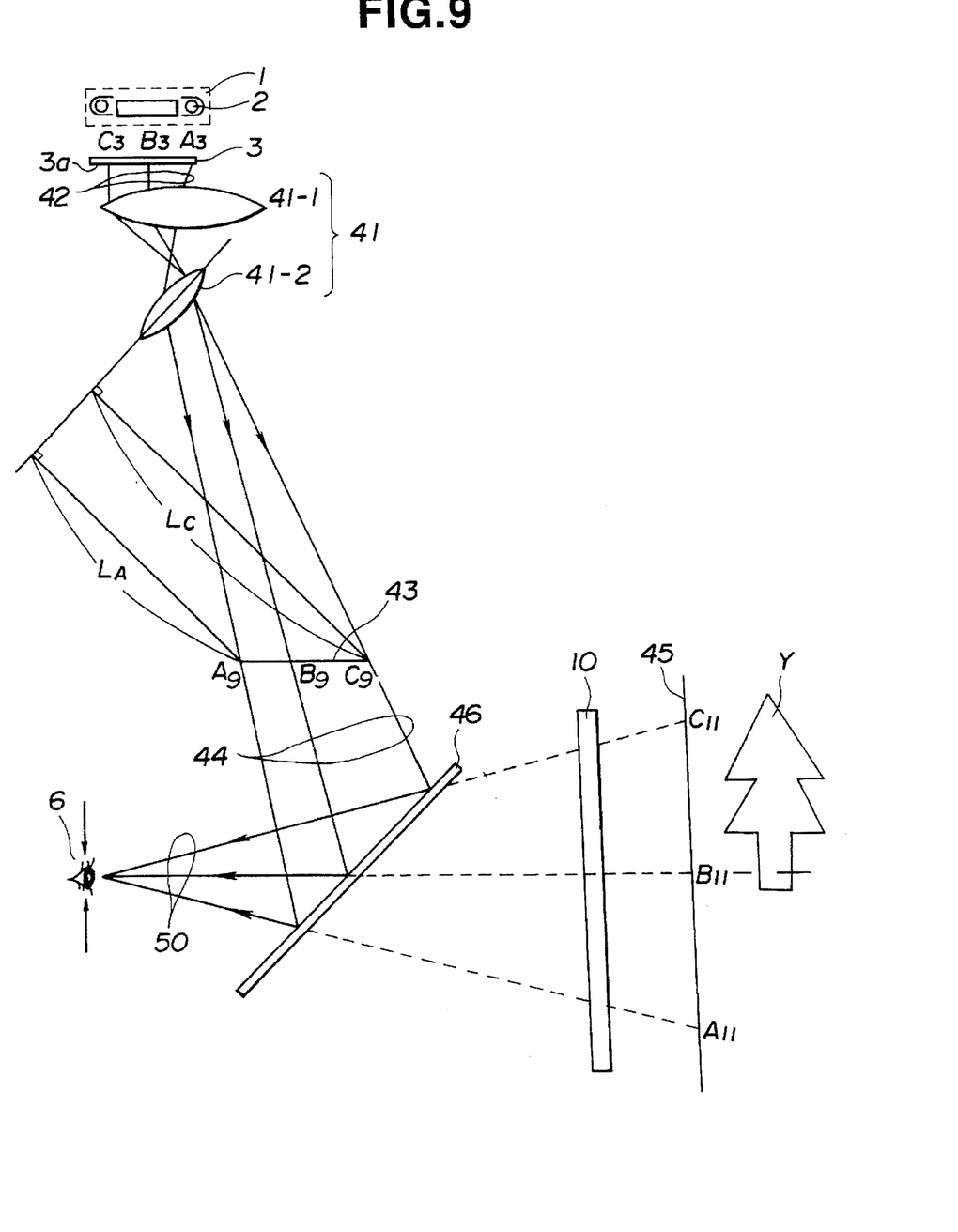
FIG. 9 is a diagram illustrating the schematic configuration of a principal portion of an image display apparatus according to a sixth embodiment of the present invention.

FIG. 9 is a diagram illustrating the schematic configuration of an image display device according to a sixth embodiment of the present invention.

In FIG. 9, illuminating unit 1 includes a fluorescent lamp 2, serving as a light source. Display device 3 comprises a liquid-crystal display device, and provides display information 3a. Relay system 41 includes lenses 41-1 and 41-2 which are off-centered (or eccentric) in the plane of FIG. 9 and images display information 3a onto intermediate image plane 43.

Beam combiner 46 comprises a hologram lens. Reference numeral 6 represents the position of a pupil for observation, which corresponds to the position of an eyeball of the observer. Reference numeral 45 represents the plane of a virtual image, on which a virtual image of the image of display information 3a on intermediate image plane 43 is formed by hologram lens 46. Symbol Y represents image information, such as an external natural landscape or the like. Light-amount adjusting member 10 has the same function as that shown in FIG. 2, and adjusts the amount of incident light from external image information Y.

In the present embodiment, after converging the principal rays from among diffused light beams 42 from points A3, B3 and C3 on display information 3a of liquid-crystal display device 3 onto substantially one point by lens 41-1, a real image of display information 3a is formed on the intermediate image plane 43 by the off-centered lens 41-2.

The light beam from the image of display information 3a on the intermediate image plane 43 is reflectively diffracted by hologram lens 46 in the direction of the pupil 6 of the observer. At that time, the image of display information 3a on the intermediate image plane 43 is formed on the virtual-image plane 45 as a magnified virtual image.

Thus, in the present embodiment, external image information Y and a magnified virtual image of display information 3a are spatially superimposed, and are observed in the same field of view.

In the present embodiment, the intermediate image plane 43 is disposed at a position in the vicinity of hologram lens 46. It is thereby possible to form the image of the display information 3a on the intermediate image plane 43 on the virtual-image plane 45 with a large magnification by hologram lens 46.

In the present embodiment, hologram lens 46 is inclined relative to the direction of the line of sight of the observer by a predetermined amount. Hologram lens 46 has a large reflective optical power, so that the image of display information 3a on the intermediate image plane 43 is formed on the virtual-image plane 45 with a large mangnification. As a result, hologram lens 46 tends to produce a distortion in the display image.

Accordingly, in the present embodiment, the distortion produced by hologram lens 46 is corrected using relay system 41 having the off-centered lenses.

Next, a description will be provided of the method of correcting distortion in the present embodiment by backwardly tracing the optical path from the pupil 6 of the observer.

Respective light beams having image information 3a corresponding to three points $A_{11}$, $B_{11}$ and $C_{11}$ ($L(A_{11} \cdot B_{11})$ =$L(B_{11} \cdot C_{11})$, where $L(A_{11} \cdot B_{11})$ represents the distance between points $A_{11}$ and $B_{11}$ (other distances being represented in the same manner) on the virtual-image plane 45 incident upon the pupil 6 are substantially condensed at points $A_9$, $B_9$ and $C_9$ on the intermediate image plane 43, respectively.

Due to the distortion produced by the hologram lens 43, $L(A_9 \cdot B_9) < L(B_9 \cdot C_9)$ holds in spite of $L(A_{11} \cdot B_{11}) = L(B_{11} \cdot C_{11})$.

Lens 41-2 is inclined by a predetermined amount so that light beams from the three equidistant points $A_3$, $B_3$ and $C_3$ ($L(A_3 \cdot B_3) = L(B_3 \cdot C_3)$) on liquid-cyrstal display device 3 are imaged on the intermediate image plane 43 so as to satisfy the relationship $L(A_9 \cdot B_9) < L(B_9 \cdot C_9)$ adjusted to the distortion produced by the hologram lens 43.

That is, the optical distance from point $C_3$ to the principal plane of lens 41-2 measured vertically to the principal plane is arranged to be smaller than the optical distance from point $A_3$ to the principal plane of lens 41-2 measured in the same manner, so that the relationship $L_C > L_A$ holds between distances $L_C$ and $L_A$ from points $C_9$ and $A_9$ to the principal plane of lens 41-2 measured vertically to the principal plane, respectively.

Thus, by changing the imaging magnification on the intermediate image plane 43, the relationship $L(A_9 \cdot B_9) < L(B_9 \cdot C_9)$ is obtained.

Although an explanation has been provided of the three points A, B and C, the lens 41-2 and the hologram lens 46 are designed and manufactured so that the same effects are provided for all points which can be observed by the observer.

Since the intensity of the light beam generated from liquid-crystal display device 3 illuminated by illuminating unit 1 for backlight has a large value in a direction substantially perpendicular to liquid-crystal display device 3, lens 41-1 is disposed so that the light beam is effectively incident upon lens 41-2.

The method shown in FIG. 4 is suitably applied as a method of manufacturing the hologram lens in the present embodiment.

In the present embodiment, instead of the hologram lens, a reflecting optical element having a similar reflective optical power, such as a concave half-mirror or the like, may also be used. Also in this case, the distortion produced when the element is disposed in an inclined state as in the case of the hologram lens can be corrected by the above-described relay system 41 in the same manner.

Figure 10:
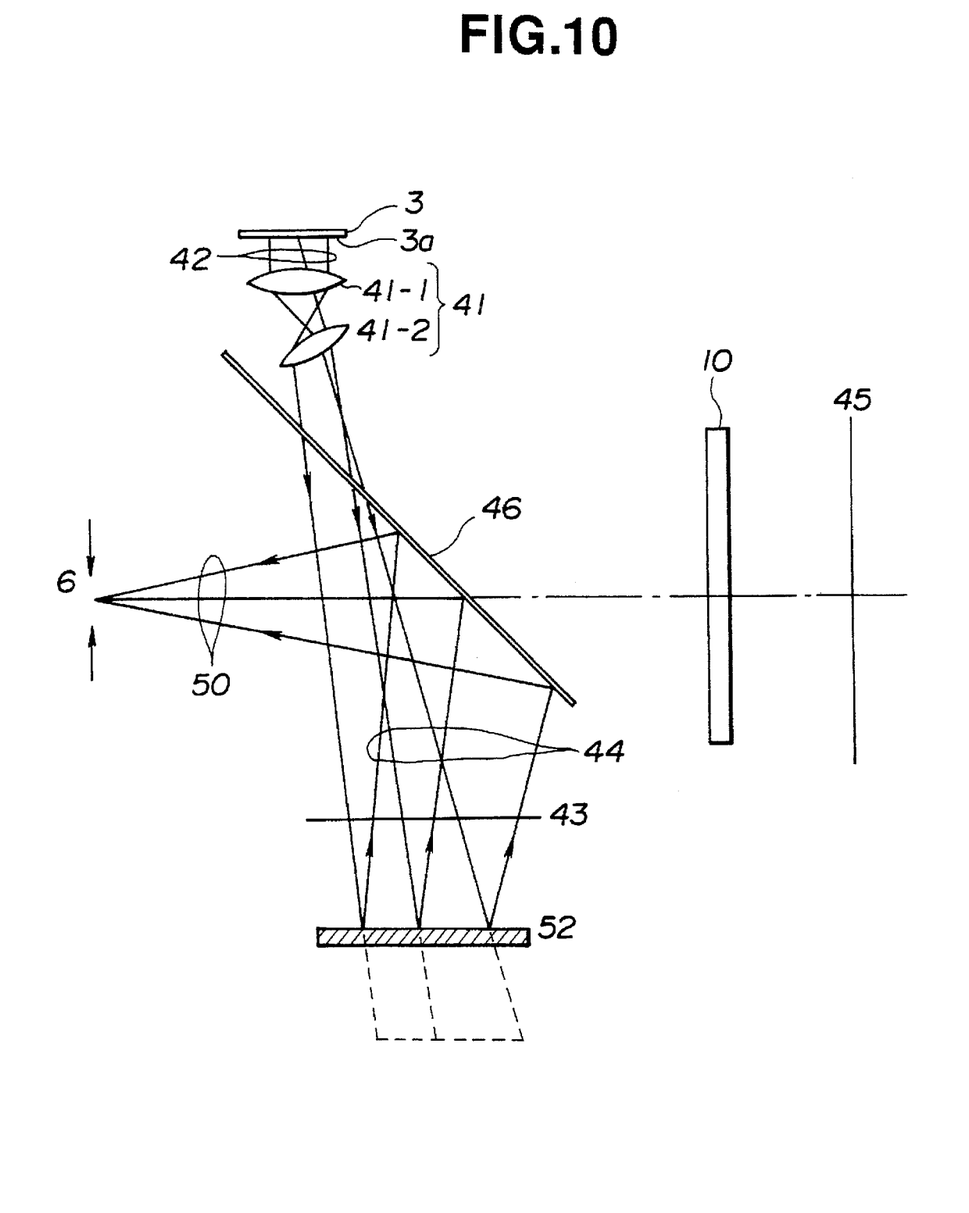
FIG. 10 is a diagram illustrating the schematic configuration of a principal portion of an image display apparatus according to a seventh embodiment of the present invention.

FIG. 10 is a diagram illustrating the schematic configuration of a principal portion of an image display apparatus according to a seventh embodiment of the present invention. In FIG. 10, the same components as those shown in FIG. 8 are represented by the same reference numerals.

In FIG. 10, the light beam from liquid-crystal display device 3 first passes through relay system 41, then passes through hologram lens 46, and is reflected by plane mirror 52 to form an image of display information 3a onto intermediate image plane 43.

Thereafter, the light beam representing the image on the intermediate image plane 43 is reflectively diffracted to enter the pupil 6 of the observer. At that time, hologram lens 46 forms a magnified virtual image of display information 3a on the virtual-image plane 45, and the virtual image is spatially superimposed with external image information Y. The observer observes the magnified virtual image of display information 3a formed on the virtual-image surface 45 and the external image information Y in a superimposed state in the same field of view.

In the present embodiment, by using plane mirror 52, the optical path is deflected, whereby the size of the entire apparatus is reduced.

The hologram lens 46 is a volume-phase-type hologram lens manufactured by the method shown in FIG. 4, and has angle-selective characteristics. Accordingly, the plane mirror 52, the relay system 41, the liquid-crystal display device 3 and the like are arranged so that the incident angles of the light beam when the light beam first passes through hologram lens 46 and when the light beam is again incident to be reflectively diffracted do not correspond to the angular selection of the hologram lens 46.

Thus, when the light beam is first incident upon hologram lens 46, almost all of the light beam is transmitted. When the light beam is again incident upon hologram lens 46, almost all of the light beam is reflected.

As in the sixth embodiment, in the present embodiment, the distortion produced by hologram lens 46 is corrected utilizing relay system 41, and thus an excellent observation system is provided.

In the present embodiment, the semitransparent concave Fresnel lens 26 shown in FIG. 5 may be used instead of hologram lens 46 in the same manner as described above.

Figure 11:
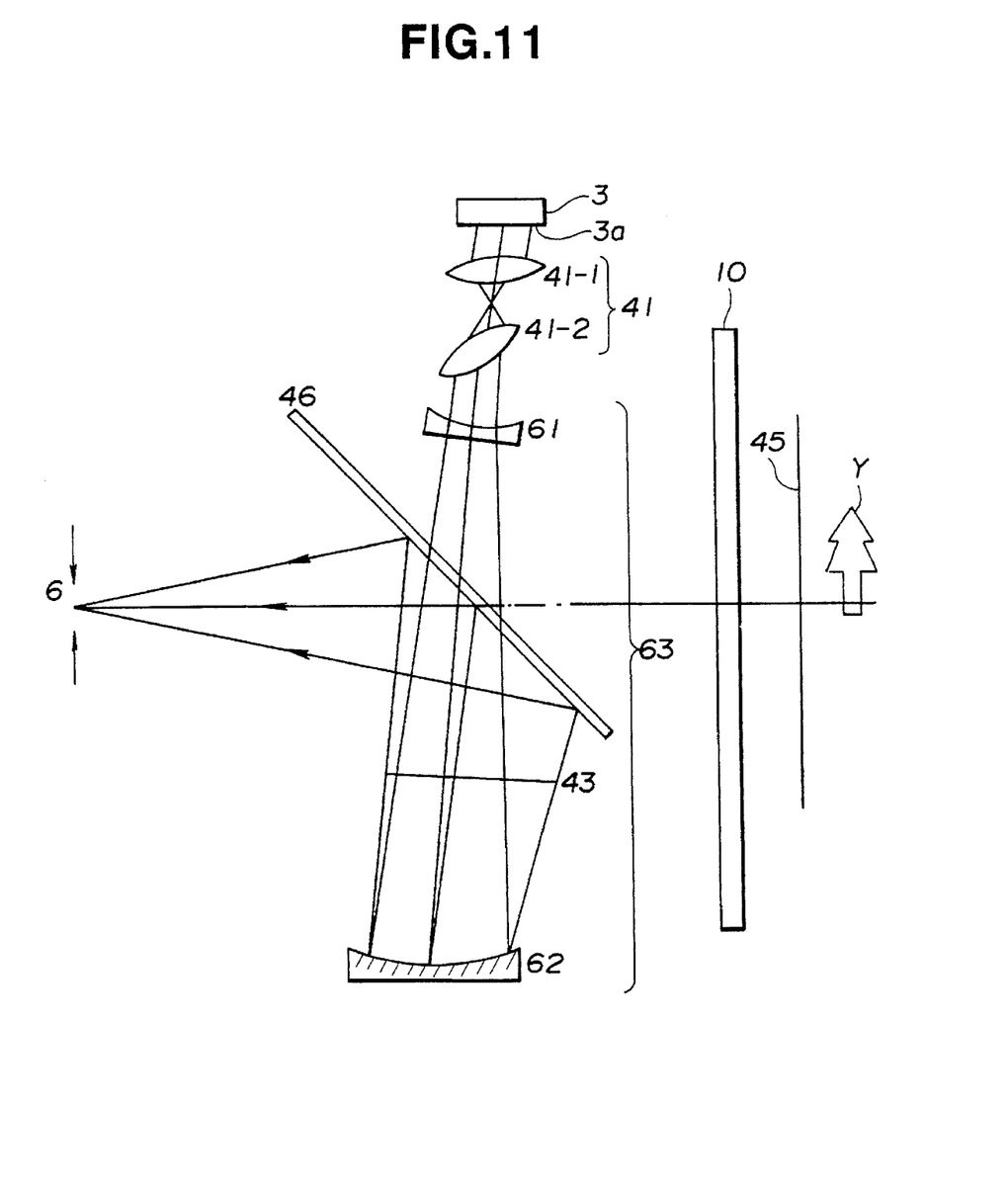
FIG. 11 is a diagram illustrating the schematic configuration of a principal portion of an image display apparatus according to an eighth embodiment of the present invention.

FIG. 11 is a diagram illustrating the schematic configuration of an image display apparatus according to an eighth embodiment of the present invention. In FIG. 11, the same components as those shown in FIG. 10 are represented by the same reference numerals.

In FIG. 11, a cylindrical lens 61 has a refractive power only in a direction parallel to the plane of FIG. 11, and a cylindrical concave mirror lens 62 also has a reflective optical power only in a direction parallel to the plane of FIG. 11. Cylindrical lens 61 and cylindrical concave mirror lens 62 are arranged so that the positions of their focal points substantially coincide to form a so-called cylindrical telescopic system 63.

In the present embodiment, relay system 41 having the same configuration as that shown in FIG. 10 comprises lenses 41-1 and 41-2 off-centered within the plane of FIG. 11. In this configuration, due to asymmetry in a direction perpendicular to the plane of FIG. 11, a difference is produced in the imaging magnification in the vertical direction (a direction parallel to the plane of FIG. 11) and a lateral direction (a direction perpendicular to the plane of FIG. 11) with respect to the observer, thereby causing in some cases a distortion due to the difference in magnification in the two directions.

The present embodiment has a feature in that this distortion is corrected by the cylindrical telescopic system 63.

In the present embodiment, the light beam from liquid-crystal display device 3 first passes through relay system 41 and cylindrical lens 61, then passes through hologram lens 46 without being reflected, and enters cylindrical concave mirror lens 62. Thereafter, the light beam is reflected by cylindrical concave mirror 62 to form an intermediate image of display information 3a onto intermediate image plane 43. The light beam then is reflectively diffracted by hologram lens 46 to enter the pupil 6 of the observer. Hologram lens 46 forms a magnified virtual image of display information 3a on the virtual-image plane 45.

As in the sixth and seventh embodiments, in the present embodiment, the imaging of the liquid-crystal display device 3 on the intermediate image plane 43 and the correction of the distortion are performed mainly by relay system 41. Cylindrical telescopic system 63 adjusts the imaging magnification in a direction parallel to the plane of FIG. 11 (the vertical direction with respect to the observer), so that the magnifications in the vertical direction and in a lateral direction have substantially the same value in the entire optical system.

In the present embodiment, relay system 41, cylindrical lens 61, cylindrical concave mirror lens 62 and hologram 46 may be used so that the magnifications in the vertical direction and in a lateral direction coincide.

In the above-described embodiments, two observation systems may be provided so as to provide liquid-crystal display devices with two kinds of display information having a parallax to be observed by the right eye and the left eye of the observer, respectively. This could be accomplished by providing an image generator that generates two kinds of light including image information, or by using two image generators for generating two kinds of light including image information. Thus, display information having a stereoscopic effect can be observed.

This invention relates to an apparatus for image display, and may be used, for example, for a head-up display or a helmet-mounted display.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display apparatus, comprising:
   a light source emitting light;
   an image generator for generating image information in a first light supplied by said light source, wherein said image generator generates two kinds of light including image information having a parallax therebetween;
   a beam combiner for superimposing the first light and a second light which is incident upon said beam combiner from a direction different from that of the first light, and for guiding the superimposed light to a pupil of an observer, wherein said beam combiner comprises an optical element functioning as a lens, and said beam combiner and said reflector guide the two kinds of light to the right eye and the left eye of the observer; and
   a reflector positioned in a direction different from the incident direction of the second light on said beam combiner, receiving the first light via said beam combiner, and reflecting the first light back to said beam combiner.

2. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer, wherein said beam combiner comprises an optical element for functioning as a lens and said optical element comprises a hologram for reflectively diffracting the light; and a reflector positioned in a direction different from the incident direction of the second light on said beam combiner, receiving the first light via said beam combiner, and reflecting the first light back to said beam combiner.

3. An image display apparatus, comprising:

a light source emitting light an image generator for generating image information in a first light supplied by said light source;

a beam combiner for superimposing the first light and a second light which is incident upon said beam combiner from a direction different from that of the first light, and for guiding the superimposed light to a pupil of an observer, wherein said beam combiner comprises an optical element functioning as a lens, and said optical element comprises a Fresnel lens; and a reflector positioned in direction different from the incident direction of the second light on said beam combiner, receiving the first light via said beam combiner, and reflecting the first light back to said beam combiner.

4. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer;

a reflector positioned in a direction different from the incident direction of the second light on said beam combiner, receiving the first light via said beam combiner, and reflecting the first light back to said beam combiner; and a light-amount adjusting member for adjusting the amount of the second light before the second light is incident upon said beam combiner.

5. An apparatus according to claim 4, wherein said light-amount adjusting member comprises a liquid crystal.

6. An apparatus according to claim 4, wherein said beam combiner comprises an optical element functioning as a lens.

7. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer; and a reflector positioned in a direction different from the incident direction of the second light on said beam combiner, receiving the first light via said beam combiner, and reflecting the first light back to said beam combiner, wherein said reflector images the light having the image information from said image generator in the vicinity of said beam combiner, and said reflector comprises a dioptic lens and a plane mirror.

8. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer;

a reflector positioned in a direction different from the incident direction of the second light on said beam combiner, receiving the first light via said beam combiner, and reflecting the first light back to said beam combiner, wherein said image generator is off-centered with respect to a center of said reflector; and a relief grating structure for guiding light emitted from said light source.

9. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer, wherein said beam combiner comprises an optical element functioning as a lens; and a relay optical system having an optical axis, positioned between said image generator and said beam combiner, comprising optical elements which are eccentrically disposed with respect to the optical axis of said optical system, wherein said optical element comprises a hologram for reflectively diffracting the light.

10. An image display apparatus, comprising:

a light source emitting light;

an image generator for generating image information in a first light supplied by said light source;

a beam combiner for superimposing the first light and a second light which is incident upon said beam combiner from a direction different from that of the first light, and for guiding the superimposed light to a pupil of an observer, wherein said beam combiner comprises an optical element functioning as a lens; and a relay optical system having an optical axis, positioned between said image generator and said beam combiner, comprising optical elements which are eccentrically disposed with respect to the optical axis of said optical system, wherein said optical element comprises a Fresnel lens.

* * * * *

UNITED STATES PATENT AND TRADEMARK OFFICE
CERTIFICATE OF CORRECTION

PATENT NO. : 5,625,493
DATED : April 29, 1997
INVENTOR(S) : Matsumra, et al

It is certified that error appears in the above-identified patent and that said Letters Patent is hereby corrected as shown below:

On the title page, item

[56] REFERENCES CITED:

U.S. PATENT DOCUMENTS, "Becht" should read --Becht et al.--.
"Banbury" should read --Banbury et al.--.
"Chern" should read --Chern et al.--.

FOREIGN PATENT DOCUMENTS, "3203478 9/1991 Japan" should read --3-203478 9/1991 Japan--.

COLUMN 8: Line 13,

"is-inclined" should read --is inclined.--.

Signed and Sealed this

Fourteenth Day of October, 1997

*Attest:*

BRUCE LEHMAN

*Attesting Officer*   *Commissioner of Patents and Trademarks*